United States Patent

[11] 3,615,296

| [72] | Inventor | Vincent Guarnaschelli<br>Greenlawn, N.Y. |
|---|---|---|
| [21] | Appl. No. | 876,755 |
| [22] | Filed | Nov. 14, 1969 |
| [45] | Patented | Oct. 26, 1971 |
| [73] | Assignee | The Nycal Company, Inc.<br>Carlstadt, N.J. |

[54] MEANS FOR ENHANCING COMBUSTION EFFICIENCY IN INTERNAL COMBUSTION ENGINES
15 Claims, 14 Drawing Figs.

[52] U.S. Cl.................................................. 48/180 R,
48/180 S, 48/180 M, 123/141
[51] Int. Cl.................................................. B01f 3/02,
F02m 17/00
[50] Field of Search............................................48/180, 180
M, 180 P, 180 R; 123/119 R, 141

[56] References Cited
UNITED STATES PATENTS
| 1,450,550 | 4/1923 | Hudson | 48/180 R |
| 1,937,875 | 12/1933 | Denman et al. | 48/180 |
| 2,415,668 | 2/1947 | Barabino | 48/180 |
| 3,490,883 | 1/1970 | Olivie | 48/180 |

*Primary Examiner*—Morris O. Wolk
*Assistant Examiner*—R. E. Serwin
*Attorney*—Frank Ledermann ABSTRACT: A bladed wheel, fan, turbine or the like is mounted in or below the downdraft side of the carburetor and has an even number of equidistantly spaced blades alternate ones of which are tilted at a relatively large angle to the axis of the turbine to cause rotation of the turbine by the fuel intake suction while the remaining blades each of which is positioned between two propulsion blades have any angle of tilt with respect to the tilt angle of the propulsion blades such that said remaining blades resist and slow down the speed of rotation of the turbine while causing more thorough mixing of the fuel and air mixture, consequent to increased vaporization of the fuel.

PATENTED OCT 26 1971  3,615,296

INVENTOR.
VINCENT GUARNACHELLI
BY
F. Ledermann
ATTORNEY

INVENTOR.
VINCENT GUARNASCHELLI
BY
F. Ledermann

MEANS FOR ENHANCING COMBUSTION EFFICIENCY IN INTERNAL COMBUSTION ENGINES

This invention aims to provide means for providing a more thorough vaporization of the liquid fuel and mixing thereof with the intake air prior to distribution thereof to the engine cylinders. It serves to vaporize the fuel component to maintain adequate charge velocity for stable entrainment of the fuel without the sacrifice of volumetric efficiency.

It has long been known that internal combustion engines do not completely burn all the elements of the fuel in the combustion chambers, whence the incompletely burned gases are exhausted into the atmosphere as pollutants. In order to prepare a most nearly perfect mixture of fuel and air before entering the combustion chambers a bladed wheel, fan, turbine or the like, hereinafter termed a turbine, has been evolved with six or more blades. Three of the blades have an angle of tilt, for example, 45°, to be acted upon by the intake suction to propel the turbine. The remaining three blades, each of which is positioned equidisantly between two propulsion blades, have a tilt to the axis of the turbine which preferably ranges between a zero angle and an angle of about 5° to the said axis and in a direction reverse to the direction of tilt of the propulsion blades.

The instant turbine may be mounted in the downdraft side of the carburetor or in the inlet pipe into the intake manifold. All fuel discharged from the main carburetor nozzle or the accelerating pump of the carburetor, together with the intake air, must pass through this rotating turbine. The propulsion blades are forced by the intake suction to rotate the turbine while the other three blades at zero to about 5° angle in reverse slow down the rotational speed of the turbine and prevent the turbine from functioning as a supercharger. As a result of this slowing down and the resistance offered to the through flow of fuel and air by the said remaining blades the fuel and air are more thoroughly mixed and the fuel is more thoroughly vaporized, hence causing a more complete burning of the fuel.

Tests of this turbine have shown increased power, better economy and a tremendous reduction in exhaust pollutants. It is to be noted that the portion of the downdraft side of a carburetor below the butterfly valve and the inlet end or pipe of the intake manifold together constitute a conduit.

Referring briefly to the accompanying drawing.

Figure 1:
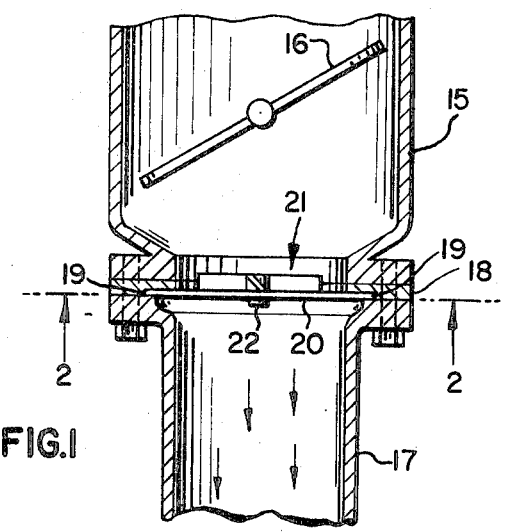
FIG. 1 is a fragmentary longitudinal sectional view of the downdraft side of a carburetor and the adjacent inlet end of the intake manifold, illustrating one form of the instant turbine mounted in place wherein the turbine is shown having three propulsion blades tilted at a 45° angle and alternate blades at zero tilt to the vertical.

Referring in detail to the drawing, the numeral 15 designates the downdraft side or bottom portion of a carburetor, that is, the part which houses the butterfly valve 16. Normally the inlet end of the intake manifold 17 is attached directly to the bottom of the carburetor. To install the instant turbine, a preferably nonmetallic gasket or spacer 18, hereinafter referred to as a spacer, is clamped between the carburetor and the intake manifold 17. This spacer has diametrically opposed notches 19 cut preferably only part way into or formed in the bottom surface of the gasket. A bar or strip 20 has its ends registering in these notches and is thus clamped, together with the spacer, between the carburetor and the manifold.

A turbine 21 is rotatably supported on a vertical shaft or pin 22 secured, in an obvious manner, in a hole centered in the bar 20 and indicated at 23. The turbine 21 of FIGS. 1 through 5 is shown having three propulsion blades 24 all tilted in the same direction at an angle of 45° to the vertical (FIG. 5) and three blades 25 having zero tilt to the vertical and each of which is positioned between two blades 24.

The intake suction operates on the blades 24 to rotate the turbine while the blades 25 not only tend to slow down such rotation but also to cause a turbulence in the mixture of fuel and air to more thoroughly mix the two before the mixture passes through the turbine for entrance into the combustion chambers of the engine cylinders, with consequent more complete burning.

Figure 7:
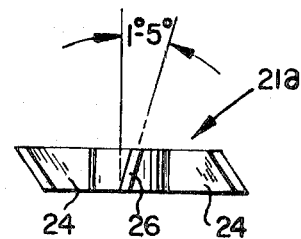
FIG. 7 is a view taken along the line 7—7 of FIG. 6.
Figure 6:
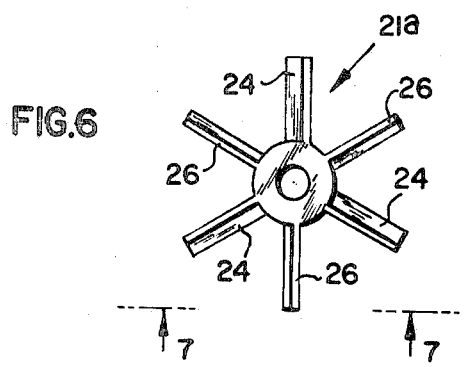
FIG. 6 is a bottom plan view of a modified form of the turbine wherein the alternate blades are shown tilted at an angle of 5° in a direction reverse to the tilt of the propulsion blades.

The turbine 21a of FIGS. 6 and 7 has, like the turbine 21, the same propulsion blades 24 tilted at an angle of 45°, but here the alternate blades 26 are shown tilted at an angle of 5° to the vertical in a direction reverse to the direction of tilt of the blades 24. As a consequence of this reverse tilt, an increased resistance is provided to the rotational speed of the turbine, which results in an increased turbulence and mixing of fuel and air with consequent even more efficient combustion. The 5° angle of reverse tilt is shown merely by way of example as the approximate maximum within the range between zero tilt and 5° of reverse tilt for improvement in combustion. Tests to date appear to show that a reverse tilt of 1° effects a maximum improvement in combustion, but a reverse tilt somewhat greater than 5° will also result in a beneficial effect.

Figure 2:
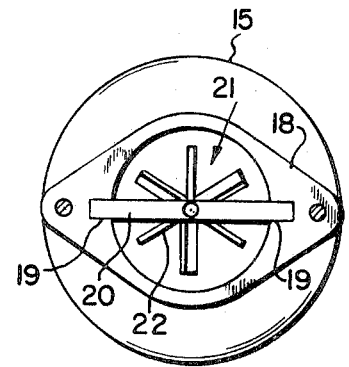
FIG. 2 is a sectional view taken on the line 2—2 of FIG. 1.
Figure 4:
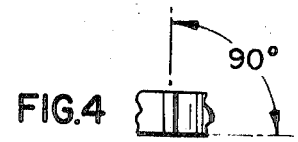
FIG. 4 is a view taken along the line 4—4 of FIG. 3.
Figure 5:
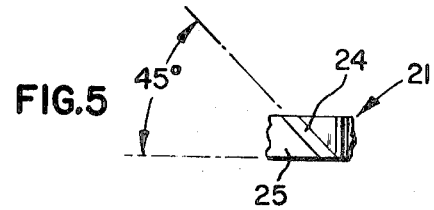
FIG. 5 is a view taken along the line 5—5 of FIG. 3.
Figure 3:
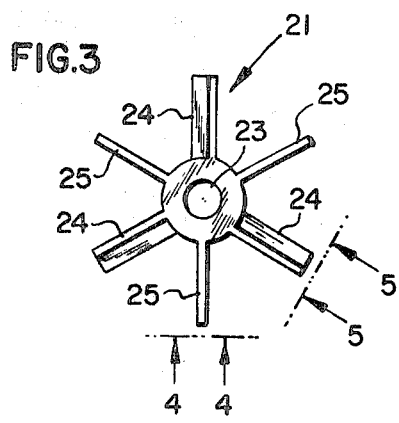
FIG. 3 is a bottom plan view of the turbine of FIGS. 1 and 2 per se.
Figure 10:
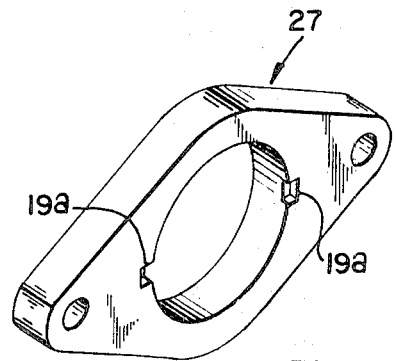
FIG. 10 is a perspective view showing a modified form of gasket or spacer, that is, a thicker one which may be substituted for the thinner spacer shown in FIGS. 1 and 2.
Figure 9:
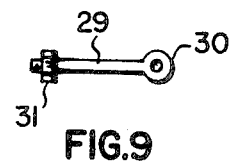
FIG. 9 is a bottom plan view of the turbine supporting means of FIG. 8.

The installation shown in FIGS. 1 and 2 is applicable to a carburetor wherein the butterfly valve when fully open cannot engage the turbine. In carburetors where the butterfly valve is so positioned that it would engage the turbine when fully opened, a thicker spacer such as shown, merely by way of example, at 27 in FIG. 10 is substituted for the spacer 18 of FIGS. 1 and 2, the actual thickness of the spacer depending upon the requirements of the specific carburetor. Here the notches 19a, equivalent to the notches 19, are also formed or cut into the bottom surface of the spacer.

Figure 8:
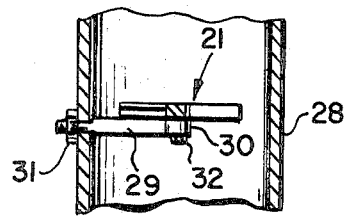
FIG. 8 is a fragmentary longitudinal sectional view of a different type of carburetor, showing a modified form of supporting means for the turbine.

FIG. 8 is presented to show at 28 either the lower end of a carburetor wherein such end is extended and the butterfly valve, not shown, is assumed to be positioned high enough above the turbine to clear it at maximum open position; or 28 may designate the upper end portion of the inlet end or pipe leading into the intake manifold. The turbines shown in FIG. 8 and FIGS. 11-14 are similar to the turbine 21 of FIG. 3, but merely by way of example to illustrate another way of supporting the turbine. In FIG. 8 a support rod 29 having a hole on its end provided by a ring 30, is preferably threaded at its outer end and screwed into a threaded hole in the housing or wall 28, being locked in place by a nut 31. The turbine is rotatably mounted on a pin 32 extending through the passage in the ring 30.

Figure 11:
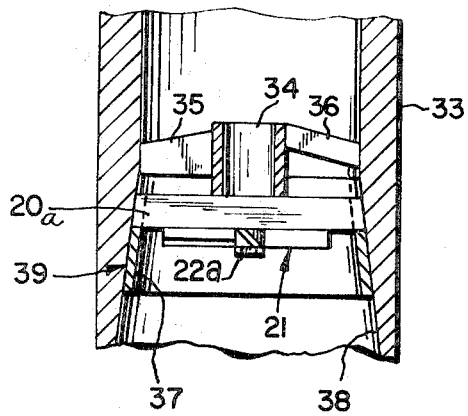
FIG. 11 is a fragmentary longitudinal sectional view of another type of carburetor together with a modified supporting means for the turbine.
Figure 12:
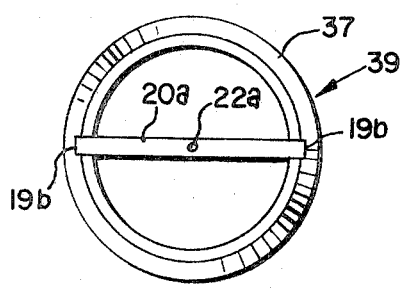
FIG. 12 is a top plan view of the turbine supporting means of FIG. 11, per se.

FIGS. 11 and 12 show at 33 the lower end of still another form of carburetor, wherein a vertical tube 34 of reduced diameter is supported by webs 35 and 36 extending from the inner wall of the housing 33. In FIG. 11 is shown a support means 39 consisting of a tapered ring or hoop 37 preferably force-fitted within the complementarily tapered inner wall 38 of the housing. Here the bar 20a, equivalent to the bar 20 of FIGS. 1 and 2, registers in notches 19b provided in the top circumferential edge of the hoop 37. The turbine 21 is rotatably supported under the bar 28a on a pin 22a.

Figure 13:
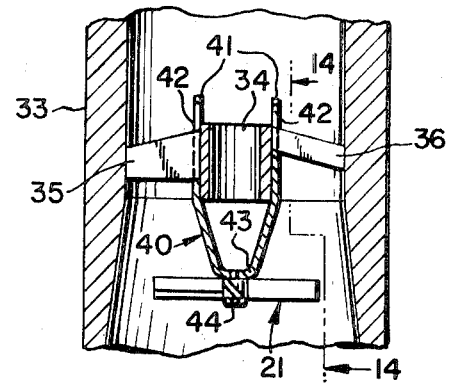
FIG. 13 is a view of the carburetor of FIG. 11 but provided with a modified form of turbine supporting means.
Figure 14:
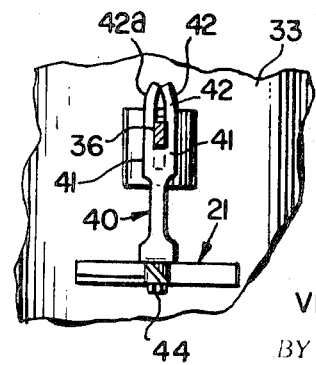
FIG. 14 is a sectional view taken on the line 14—14 of FIG. 13.

Another support means for the turbine in the carburetor 33 is shown in FIGS. 13 and 14. It is to be noted that the web 35 extends lower down than does the web 36. That actually makes no difference in the support means for the turbine, as the latter consists of a yoke 40 which has the upper portions of its legs 41 mutually parallel and forked thus providing longitudinal slits 42. FIG. 13 shows the yoke in condition after its forked upper leg portions have been slipped over the webs 35, 36, while FIG. 14 shows the yoke fixed in place pinching the two extremities 42a of each fork together above the webs, as by means of a pair of pincers. The base 43 of the yoke is flat and has a hole therein in which is engaged a pin 44 on which the turbine 21 is rotatably mounted below the base.

Although the blades 24 in each turbine disclosed have been described as having a tilt of 45°, it is obvious that this angle may be somewhat larger or smaller without greatly altering the manner of functioning of the turbine.

The various support means illustrated and described are examples of various ways of installing the turbine, it is obvious that other ways may also be devised.

If the reverse angle of the alternate blades were too large the turbine would be slowed too greatly and thus the degree of mixing of fuel and air would largely be unaffected since a too slowly rotating turbine will cause too little stirring or turbulence in the mixture and the latter will flow too freely through the turbine. The air-fuel mixture acted upon by the zero angle or reverse angle blades is diverted from immediately following the helical path produced by the propulsion blades alone, with a consequent lapse of time before the mixture can be drawn through the turbine. The time interval or delay gives the fuel more time to vaporize and mix with the air, producing a more equal distribution of fuel vapor and air with consequent increased burning of fuel vapor and air with consequent increased burning of fuel. Tests have shown that a zero reverse angle is effective in enhancing combustion, but not as effective as a small reverse angle. The zero angle blades tend to push the passing mixture sideways parallel to the plane of the turbine, whereas reverse angle blades tend to urge the passing mixture upwards where it is met by the down-flowing mixture, as in collision, with consequent added turbulence.

The turbines herein disclosed have been described as composed of a total of six blades, but it is obvious that any even total number other than six may also be provided so long as the zero angle or reversely tilted blades are each positioned between two propulsion blades.

To express the invention of the instant turbine more precisely, one even number of blades has a tilt sufficient to cause rotation of the turbine at a suitable speed by the intake suction while a like even number of alternate blades have a tilt with respect to the tilt of the propulsion blades such that they resist the said rotation sufficiently to slow it down. The minimum of the tilt angle of the alternate blades with respect to the tilt angle of the propulsion blades in a direction reverse to the direction of tilt (with respect to the vertical) may be as low as 1/100th or even 1/1000th of a degree and still enhance combustion.

All of the blades disclosed herein have been shown as flat with parallel opposed sides. In the case of most fans, turbines or the like the blades, as is well known, have a spiral or helical twist or the like, yet such blades still have what may be termed an "effective" angle of tilt. It is to be understood that the blades disclosed herein may also be twisted rather than having parallel plane surfaces, and that wherever an angle of tilt has been mentioned above it is to be understood that the term is equivalent to the effective angle of tilt whether the blades have a twist or not.

The instant turbine is also applicable where it may be actuated or have its rotation augmented by a motor or other driving force rather than or in addition to the intake suction. In this case also the intake mixture will be directed into a helical path through the turbine by the blades such as those shown at 24 and previously termed propulsion blades.

What is claimed is as follows:

1. In an internal combustion engine which includes a carburetor and an inlet portion leading into the intake manifold of the engine whereby the downdraft side of the carburetor and said inlet portion together constitute a continuous conduit, means for improving the intermixing of fuel and air prior to entrance into said manifold consisting of a turbine mounted in said conduit in a position wherein the axis of the turbine is longitudinal to the direction of flow of said mixture, said turbine having an even number of a first set of blades tilted at a relatively large angle to said axis for propulsion of the turbine by the intake suction and having a second set of the same even number of blades each positioned between two of said propulsion blades, said second set of blades having a tilt with respect to the angle of said first set of blades such that the second set of blades resist the tendency of the turbine to rotate and thereby reduce the speed of rotation of the turbine, and means for supporting said turbine in said position.

2. In an internal combustion engine according to claim 1, said turbine being mounted in said downdraft side of said carburetor.

3. In an internal combustion engine according to claim 1, said turbine being mounted in said inlet portion of the intake manifold.

4. In an internal combustion engine according to claim 1, said turbine being mounted between said downdraft side of the carburetor and said inlet portion of the intake manifold.

5. In an internal combustion engine according to claim 4, said means comprising a gasket clamped between said downdraft side of the carburetor and said inlet portion of the intake manifold and having diametrically opposed notches therein, a bar extending across said conduit and registering in said notches, said turbine being mounted on a pin centrally positioned on and extending from said bar.

6. In an internal combustion engine according to claim 5, said notches extending part way upward through the bottom surface of said gasket, said turbine being positioned below said bar.

7. In an internal combustion engine according to claim 1, said conduit having a bar extending thereinto along a diameter thereof and having a pin thereon positioned along the axis of the conduit, said turbine being rotatably mounted on said pin.

8. In an internal combustion engine according to claim 7, said bar having a ring thereon positioned at said axis of the conduit, said pin extending through the passage through said ring.

9. In an internal combustion engine according to claim 1, said downdraft side of the carburetor having a cylindrical sleeve of reduced diameter supported coaxially therein, webs extending from opposite sides of said sleeve and secured to the wall of said conduit for supporting said sleeve, said means comprising a yoke which includes a base portion and two forked legs extending upward from said base portion, each of said webs registering in one of said forked legs, the extremities of said legs extending beyond the upper edges of said webs, said extremities being pinched together above said webs to support said yoke, said base portion having a pin thereon, said turbine being rotatably mounted on said pin.

10. In an internal combustion engine according to claim 1, said downdraft side of the carburetor having the lower portion of the internal wall thereof tapering in an upward direction, said means comprising a complementarily tapering hoop force fixed within said tapering wall, a diametrical bar extending across said hoop, said bar having a pin extending from the center thereof, said turbine being rotatably mounted on said pin.

11. In an internal combustion engine according to claim 1, said second set of blades having a zero tilt with respect to said axis of the turbine.

12. In an internal combustion engine according to claim 1, said second set of blades having a reverse tilt with respect to said axis of the turbine which is anywhere within a range between zero degrees and 5°.

13. In an internal combustion engine according to claim 1, said second set of blades having a tilt which is at an angle in a direction reverse to the direction of the tilt of said first set of blades, said reverse angle of said second set of blades lying within a range which extends between a small fraction of a degree in excess of zero as a minimum and 5° as a maximum.

14. In an internal combustion engine according to claim 1, said second set of blades having a tilt which is at an angle in a direction reverse to the direction of the tilt of said first set of blades, said reverse angle of said second set of blades lying within a range which extends between a small fraction of a degree in excess of zero as a minimum and at least 5° as a maximum.

15. In an internal combustion engine which includes a carburetor and an inlet portion leading into the intake manifold of the engine whereby the downdraft side of the carburetor and said inlet portion together constitute a continuous conduit, means for improving the intermixing of fuel and air prior to entrance into said manifold consisting of a turbine mounted in said conduit in a position wherein the axis of the turbine is longitudinal with respect to the direction of flow of the mixture of fuel and air, said turbine having an even number of a first set of blades each of which has a tilt with respect to said axis at an angle sufficient to direct said mixture in a helical path through the turbine while the turbine is rotating, said turbine having a like even number of a second set of blades each of which is positioned between two of said first set of blades, said second set of blades lying at an angle with respect to said first set of blades, said last-named angle ranging between zero angle with respect to said axis and approximately 5° with respect to said axis in a direction reverse to the direction of tilt of said first set of blades, said first-named angle having a magnitude substantially larger than that of said last-named angle.